Figure 1:
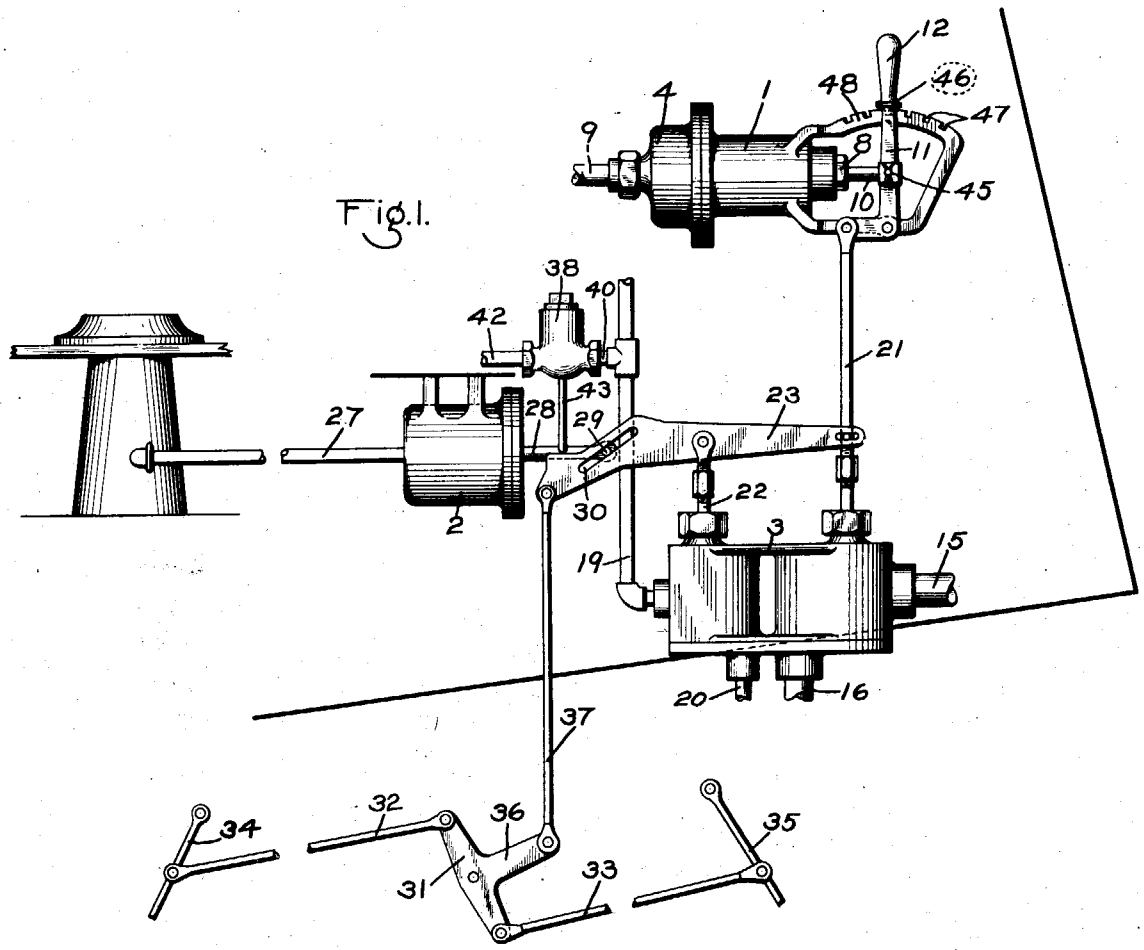

Nov. 11, 1924. Re. 15,942

C. D. STEWART ET AL

FIRE AND DRAFT REGULATING SYSTEM

Original Filed Aug. 9. 1917 3 Sheets-Sheet 1

INVENTOR
CARLTON D. STEWART
SIDNEY G. DOWN
BY Wm. M. Cady
ATTORNEY

Nov. 11, 1924. Re. 15,942

C. D. STEWART ET AL

FIRE AND DRAFT REGULATING SYSTEM

Original Filed Aug. 9, 1917 3 Sheets-Sheet 2

INVENTOR
CARLTON D. STEWART
SIDNEY G. DOWN
BY Wm. M. Cady
ATTORNEY

Nov. 11, 1924.

Re. 15,942

C. D. STEWART ET AL

FIRE AND DRAFT REGULATING SYSTEM

Original Filed Aug. 9, 1917 3 Sheets-Sheet 3

INVENTOR
CARLTON D. STEWART
SIDNEY G. DOWN
BY Wm. M. Cady
ATTORNEY

Reissued Nov. 11, 1924. Re. 15,942

UNITED STATES PATENT OFFICE.

CARLTON D. STEWART AND SIDNEY G. DOWN, OF BERKELEY, CALIFORNIA.

FIRE AND DRAFT REGULATING SYSTEM.

Original No. 1,295,077, dated February 18, 1919, Serial No. 185,351, filed August 9, 1917. Application for reissue filed January 4, 1921. Serial No. 435,096.

*To all whom it may concern:*

Be it known that we, CARLTON D. STEWART and SIDNEY G. DOWN, citizens of the United States, residents of Berkeley, in the county of Alameda and State of California, have jointly invented a certain new and useful Improvement in Fire and Draft Regulating Systems, of which the following is a specification.

This invention relates to apparatus for regulating the stoking of boilers, and more particularly where liquid fuel is employed.

One object of our invention is to provide a boiler stoking apparatus which is adapted to control combustion, either automatically, manually, or partly manually and partly automatically.

Another object is to provide an improved stoking apparatus adapted to be controlled by variations in steam boiler pressure.

The exhaust steam pressure in a locomotive is employed to force the draft and since the exhaust steam pressure will vary with the load on the locomotive, the effect of the forced draft will be varied and this exerts a certain influence on the combustion of the liquid fuel; for example; if the oil burners are placed at the front end of the fire box, the jet of fire will be toward the rear of the boilers and away from the flues. When the locomotive is working heavily, the tendency is for the draft in the flues to pull the fire forward; and in this case, it is necessary to increase the amount of steam for atomizing purposes to overcome the draft through the flues and draw the fire to the extreme rear end of the fire box. On the other hand, if the fuel burners are located in the back of the fire box, with the flame directly forward, an increased draft through the flues, occasioned by the engine working heavily, would pull the fire in the direction of the flues, in which case, it might be desirable to even decrease the amount of steam used in atomizing. It will thus be seen that the effect of variations in draft brought about by differences in the pressure of exhaust steam from the engine, have an effect on the action of the fuel oil burners.

In order to compensate for the effect of variations in forced draft due to variations in the exhaust steam pressure, another object of our invention is to provide auxiliary means controlled by the exhaust steam pressure for also regulating the stoking of the boiler.

Still another object of our invention is to provide means responsive to variations in pressure of the exhaust steam for regulating the boiler draft.

In order to maintain a predetermined desired boiler pressure in the boiler, the rate of fuel applied, and consequently the degree of fire provided, should be regulated in accordance with the variations in steam boiler pressure. And since, as before stated, regulation of the oil burners should also be controlled by the degree of exhaust steam pressure from the engine, another feature of our invention consists in providing means for automatically controlling the fire both by variations in steam boiler pressure and by variations in exhaust steam pressure.

Figure 2:
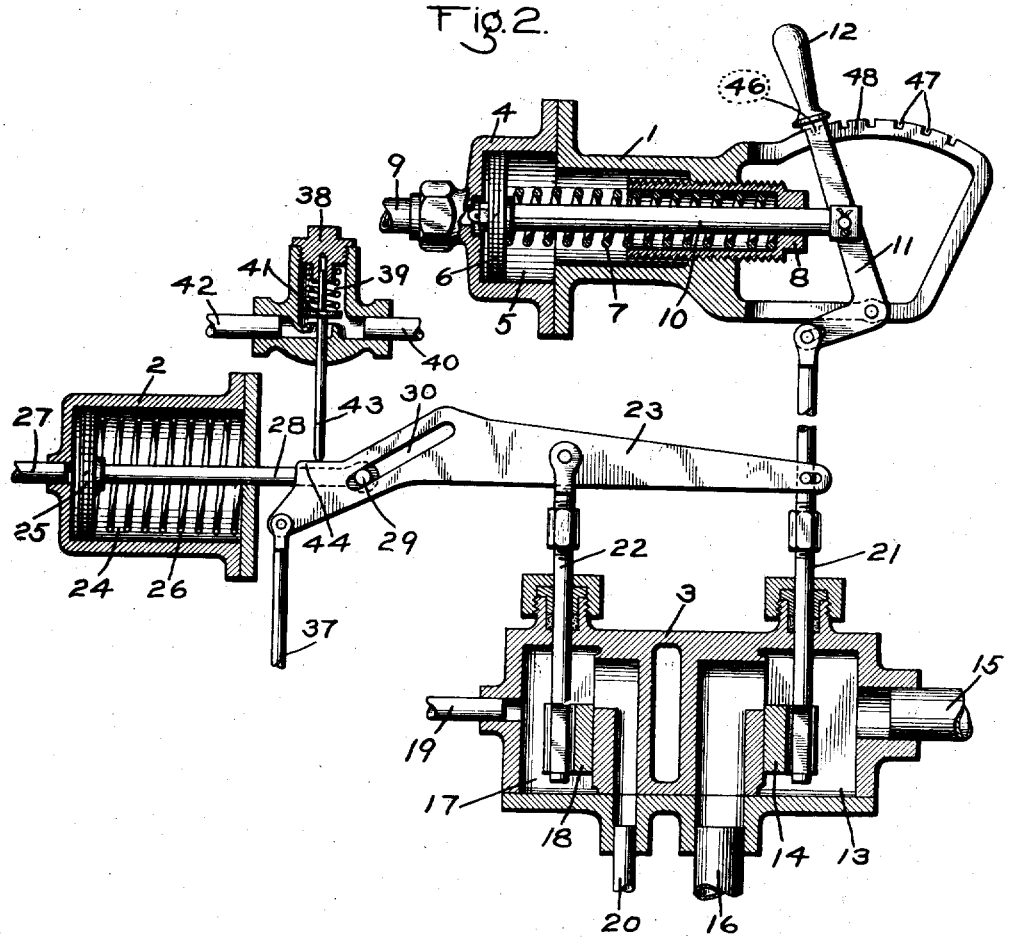
Figure 3:
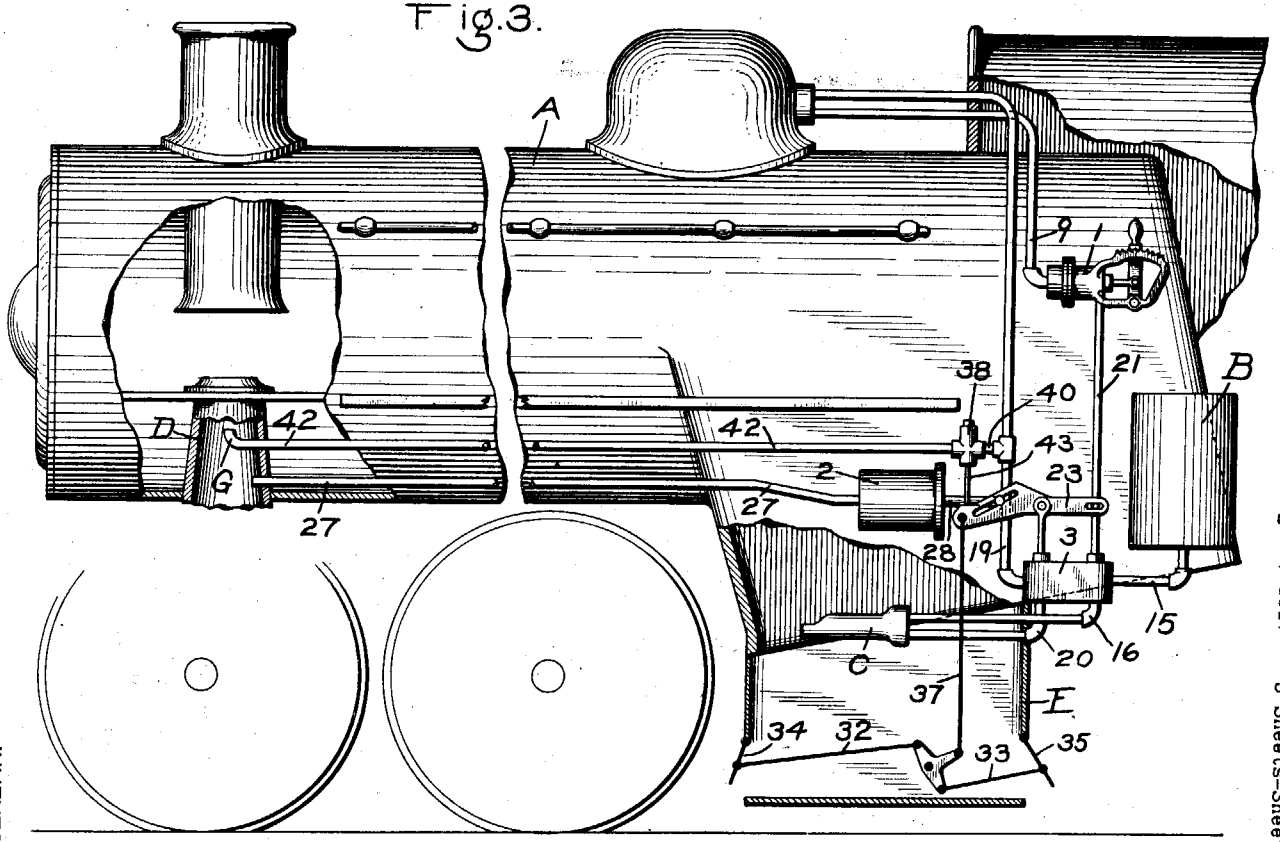

In the accompanying drawings, Figure 1 is a diagrammatic view of a boiler stoking apparatus applied to a locomotive steam boiler, and embodying our invention; Fig. 2 a sectional view of the apparatus shown in Fig. 1; and Fig. 3 a side elevation, partly in section, of a locomotive, showing the boiler stoking apparatus applied thereto.

As shown in the drawings, the apparatus may comprise a main controller 1 adapted to be operated by steam pressure from the boiler, an auxiliary controller 2 adapted to be controlled by exhaust steam, and a valve mechanism 3 adapted to be operated by said controller for regulating the flow of atomizing steam and liquid fuel to the burners.

The main controller 1 may comprise a flanged casting to which is secured a casing 4 having a piston chamber 5 containing a piston 6.

One side of the piston 6 is subject to the pressure of a coil spring 7, the pressure of which is adapted to be adjusted by means of an adjusting nut 8 and the opposite side communicates through a pipe 9 with the usual steam dome of the boiler A.

Secured to piston 6 is a stem 10 which is pivotally connected to a bell crank lever 11 having a handle 12 for manually operating the lever.

The valve mechanism 3 may comprise a casing having a valve chamber 13 containing a slide valve 14 for controlling communication from a liquid fuel supply reservoir B through a main 15 connected to a pipe 16 which leads to the fuel burners C and having a valve chamber 17 containing a slide valve 18 for controlling communication from a steam supply pipe 19 to a pipe 20 which supplies steam for fuel atomizing purposes to the fuel burners.

The fuel valve 14 is adapted to be operated by a rod 21 which is pivotally connected to one arm of the bell crank lever 11 and the steam valve 18 is adapted to be operated by a rod 22 pivotally connected to a lever 23.

The auxiliary controller 2 may comprise a casing having a piston chamber 24 containing a piston 25, one side of which is subject to the pressure of a coil spring 26 and the other side being connected to a pipe 27 through which exhaust steam, from the usual exhaust steam chamber D of the locomotive, is supplied to the piston.

The piston 25 is provided with a piston stem 28 having a pin 29 at the outer end adapted to work in an inclined slot 30 provided at one end of the lever 23, the opposite end of the lever being pivotally connected to rod 21.

In order to operate the dampers, a pivotally mounted lever 31 is provided, to the opposite ends of which are pivotally connected rods 32 and 33 respectively connected to the dampers 34 and 35. An arm 36 secured to the lever 31 is pivotally connected to one end of a rod 37, the opposite end of which is pivotally connected to the lever 23.

In operation, steam at boiler pressure acts on piston 6 and when the steam pressure exceeds the adjusted pressure of spring 7 the piston 6 will be shifted to the right a distance corresponding with the rise in steam pressure and the valves 14 and 18 are then actuated through the bell crank lever 11 to vary the size of the openings through which liquid fuel and atomizing steam are supplied to the fuel burners C, the valve 18 being actuated through the lever 23, with the pin 29 acting as a fulcrum point for the lever.

When the boiler pressure falls, the spring 7 acts to move the piston 6 to the left and thus effect the movement of the valves 14 and 18 to increase the respective port openings.

The rocking of the lever 23 on the pivot pin 29 also operates the rod 37 so as to move the dampers 34 and 35 and thus vary the natural draft openings of the ash pan E.

Exhaust steam pressure acts on piston 25 and when the exhaust steam pressure increases due to the operation of the locomotive under heavy duty, the piston 25 is shifted to the right, and the pin 29 acts in the slot 30 so as to depress the lever 23, the pivotal connection of the lever 23 to the rod 21 acting as a fulcrum. The rod 22 is thereupon actuated to increase the opening of the steam valve 18 and the damper operating rod 37 is also operated to vary the damper openings.

When the exhaust steam pressure falls, the steam valve 18 is moved to restrict the port openings while the dampers are moved in the opposite direction.

It will be noted that the operation of the auxiliary controller does not affect the fuel valve 14, while the operation of the main controller causes the movement of the fuel valve as well as the atomizing steam valve and the dampers.

The above described operation of the auxiliary controller is adapted for a condition where the fuel burners are located at the forward part of the fire box, in which case, when the locomotive is working heavily, the tendency is for the draft in the flues to pull the fire forward, so that it is necessary to increase the amount of steam for atomizing to overcome the effect of the forced draft through the flues and tend to draw the fire to the extreme rear end of the fire box.

On the other hand, if the fuel burners are located in the back of the fire box and the flame directly forward, the increased forced draft occasioned by the engine working heavily, tends to pull the fire in the direction of the flues, so that in this case it would be desirable to have the operation of the auxiliary controller reversed, so as to decrease the amount of atomizing steam as the exhaust steam pressure is increased.

It will be evident that the auxiliary controller operates independently of the main controller to vary the position of the steam valve and the dampers, but when a change in the boiler pressure occurs, the parts are operated to vary the supply of liquid fuel, atomizing steam, and the position of the dampers, the lever 23 still working about the pin 29 as a fulcrum, although the position of the pin 29 in the slot 30 may have been changed due to the operation of the auxiliary controller.

A blower valve for controllng the flow of steam from the boiler to the usual blower nozzle G may be automatically controlled by the apparatus and for this purpose a valve device 38 may be provided comprising a casing having a valve chamber 39 connected to a live steam pipe 40 and containing a valve 41 for controlling communication from said valve chamber to a pipe 42 which leads to the blower nozzle G.

The valve 41 is provided with a stem 43 adapted to engage a pad 44 formed on the lever 23.

Under the condition of low boiler pressure and substantially no exhaust steam pressure, the piston 6 being in its extreme left hand position, the pad 44 will hold the stem 43 elevated and valve 41 off its seat, so that live steam is supplied to the blower nozzle to create the necessary forced draft.

It will be noted that outward movement of piston 25 by exhaust steam pressure causes the movement of pad 44 away from stem 43, so that the valve 41 will close and thus cut off the flow of steam to the blower nozzle.

The movement of the valve 41 is also effected by the movement of lever 23 through the operation of the main controller 1, so that the operation of said valve is dependent upon the action of the main controller, the auxiliary controller, or the combined action of the controllers, with the result that the valve 41 is moved proportionately with an increase or decrease in boiler or exhaust steam pressure, insuring the desired amount of forced draft through the stack either through the engine exhaust passage or the blower nozzle.

If it is desired to provide for manual instead of automatic operation, the connecting pin 45 of the bell crank lever 11 is removed and then the parts may be operated normally by shifting the handle 12, the lever being held in its adjusted position by a spring pawl 46 adapted to engage in notches 47 of a ratchet bar 48.

It will be understood that with the manual operation, the auxiliary controller 2 is still effective to move the parts in accordance with variations in exhaust steam pressure and that the controller 2 may be employed for the sole purpose of regulating the draft.

The apparatus above described is also adapted to use powdered fuel instead of liquid fuel, and in this case, air may be employed instead of atomizing steam for moving and distributing the powdered fuel.

It will be evident that the draft alone may be controlled by variations in exhaust steam pressure from the engine by merely omitting the rod connections from the lever 23 to the valve device 3.

Having now described our invention, what we claim as new and desire to secure by Letters Patent, is:

1. In a liquid fuel burning apparatus, the combination with a valve device for supplying steam for atomizing the fuel, of means controlled by exhaust steam pressure from an engine operated by steam from a boiler heated by the burning of liquid fuel for operating said valve device.

2. In a liquid fuel burning apparatus, the combination with a valve device for varying the supply of steam for atomizing the fuel, of a piston device operated according to variations in exhaust steam pressure from an engine operated by steam from a boiler heated by the burning of liquid fuel for operating said valve device.

3. In a liquid fuel burning apparatus, the combination with a valve device for varying the supply of steam for atomizing the fuel and means for varying the supply of air for combustion, of a piston device operated by variations in exhaust steam pressure from an engine operated by steam from a boiler heated by the burning of liquid fuel for operating said valve device and said means.

4. In a liquid fuel burning apparatus, the combination with means for supplying steam for atomizing the fuel, of a main controller operated by variations in boiler pressure and an auxiliary controller operated by variations in exhaust steam pressure from an engine operated by steam from a boiler heated by the burning of liquid fuel for controlling the operation of said means.

5. In a liquid fuel burning apparatus, the combination with a valve for supplying steam for atomizing the fuel and means for varying the supply of air for combustion, of a main controller operated by variations in boiler pressure and an auxiliary controller operated by variations in exhaust steam pressure from an engine operated by steam from a boiler heated by the burning of liquid fuel for operating said valve and said means.

6. In a liquid fuel burning apparatus, the combination with a valve for supplying steam for atomizing the fuel and a valve for varying the fuel supply, of a main controller operated by variations in boiler pressure for operating said valves and an auxiliary controller operated by variations in exhaust steam pressure from an engine operated by steam from a boiler heated by the burning of liquid fuel for also effecting the operation of the atomizing steam valve.

7. In a liquid fuel burning apparatus, the combination with a valve for varying the supply of steam for atomizing the fuel and a valve for varying the supply of fuel, of manually operated means for actuating said valves and a controller operated by variations in exhaust steam pressure from an engine operated by steam from a boiler heated by the burning of liquid fuel for also operating said atomizing steam valve.

8. In a liquid fuel burning apparatus, the combination with a valve for varying the supply of steam for atomizing the fuel, a valve for varying the supply of fuel, and means for varying the supply of air for combustion of the fuel, of a main controller operated by variations in boiler pressure for operating said valves and said means and an auxiliary controller operated by variations in exhaust steam pressure from an engine operated by steam from a boiler heated by the burning of liquid fuel for operating the atomizing steam valve and said means.

9. In a liquid fuel burning apparatus, the combination with a valve for varying the supply of steam for atomizing the fuel and a valve for varying the supply of fuel, of a lever for actuating said valves, a main controller operated by variations in boiler pressure for actuating said lever to operate said valves, and an auxiliary controller operated by variations in exhaust steam pressure from an engine operated by steam from a boiler heated by the burning of liquid fuel for actuating said lever to operate said atomizing steam valve only.

10. In a liquid fuel burning apparatus, the combination with a valve for supplying steam from the boiler to force the draft, of means operated by exhaust steam pressure from an engine operated by steam from a boiler heated by the burning of liquid fuel for operating said valve.

11. In a liquid fuel burning apparatus, the combination with a valve for supplying steam from the boiler to force the draft, of means operated upon a decrease in boiler pressure and upon a decrease in exhaust steam pressure from an engine operated by steam from a boiler heated by the burning of liquid fuel for operating said valve.

12. In a liquid fuel burning apparatus, the combination with a valve for supplying steam from the boiler to force the draft, of means operated by exhaust steam pressure from an engine operated by steam from a boiler heated by the burning of liquid fuel for supplying steam for atomizing the fuel and adapted upon a decrease in exhaust steam pressure for operating said valve.

13. In a liquid fuel burning apparatus, the combination with a valve for supplying steam from the boiler to force the draft, of means operated by boiler pressure for supplying steam for atomizing the fuel and adapted upon a decrease in boiler pressure for opening said valve.

14. In a liquid fuel burning apparatus, the combination with a valve for varying the supply of steam for atomizing the fuel, a valve for varying the fuel supply, and means for varying the supply of air for combustion, of a lever for actuating said valves and said means, a main controller operated by variations in boiler pressure for actuating said lever to operate said valves and said means, and an auxiliary controller operated by variations in exhaust steam pressure from an engine operated by steam from a boiler heated by the burning of liquid fuel for actuating said lever to operate the atomizing steam valve and said means.

15. In a locomotive, the combination with a steam boiler and furnace and mechanism for controlling the draft at the furnace, of means positioned as the pressure of the exhaust steam from the locomotive increases for operating said mechanism to increase the amount of draft and as the pressure of the exhaust steam decreases to decrease the amount of draft.

16. In a locomotive, the combination with a steam boiler and furnace and mechanism for controlling the draft at the furnace, of means subject to and positioned as the degree of pressure of the exhaust steam from the locomotive increases for actuating said mechanism to increase the amount of draft.

17. In a locomotive, the combination with a steam boiler and furnace and mechanism for controlling the draft at the furnace, of a piston subject to the pressure of the exhaust steam from the locomotive and operatively connected to said mechanism for operating said mechanism.

In testimony whereof we have hereunto set our hands.

CARLTON D. STEWART.
SIDNEY G. DOWN.